Nov. 21, 1939. F. L. REYNOLDS Re. 21,276

CHEMICAL HEATING PAD FOR PERMANENT HAIR WAVING

Original Filed Nov. 8, 1938

INVENTOR.
Frederick L. Reynolds
BY Paul D. Fleher
ATTORNEY

Reissued Nov. 21, 1939 Re. 21,276

UNITED STATES PATENT OFFICE 21,276

CHEMICAL HEATING PAD FOR PERMANENT HAIR WAVING

Frederick L. Reynolds, Mill Valley, Calif., assignor to United States Appliance Corporation, San Francisco, Calif., a corporation of California Original No. 2,153,678, dated April 11, 1939, Serial No. 239,482, November 8, 1938. Application for reissue August 12, 1939, Serial No. 289,844

5 Claims. (Cl. 132—36.2)

This invention relates generally to the construction of chemical heating pads, particularly pads suitable for carrying out heating operations in permanent hair waving. The subject matter disclosed and claimed herein has been continued in part from my co-pending application Serial No. 176,229, filed November 24, 1937.

In said co-pending application Serial No. 176,229, filed November 24, 1937, there is disclosed a chemical heating pad for permanent hair waving, making use of an inner assembly adapted to be moistened with a chemical solution for carrying out an exothermic reaction. The inner assembly is enclosed by a protective wrapper, and includes absorbent material together with aluminum foil. The chemical necessary for exothermic reaction with the aluminum foil, is carried by the chemical solution.

It is an object of the present invention to provide a chemical heating pad of the above character which will be entirely safe for use by beauty parlor operators, particularly with respect to possible fire hazards.

A further object of the invention is to provide a pad of the above character which will be immune to deterioration before use, and which over a comparatively long period of time will react in substantially the same manner with a solution of given strength.

Further objects of the invention will appear from the following description in which the preferred embodiments of the invention have been set forth in detail in conjunction with the accompanying drawing.

Referring to the drawing.

Figure 1:
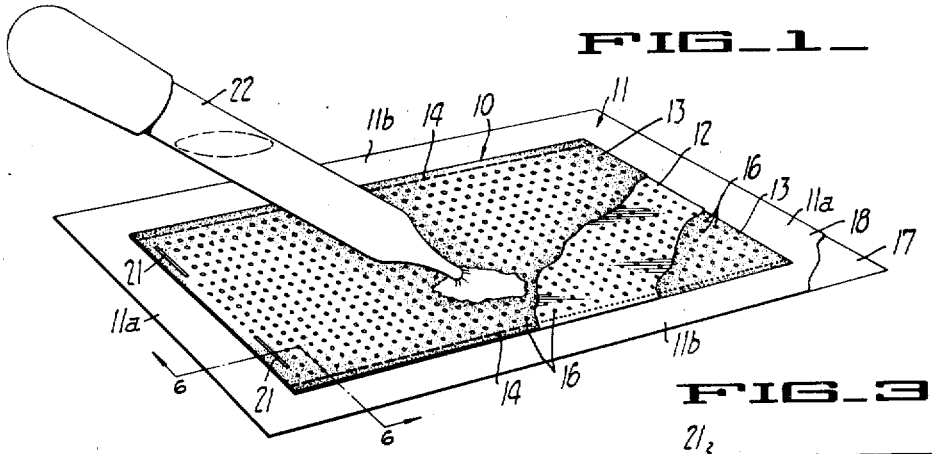
Fig. 1 is a perspective view illustrating a pad incorporating the present invention and showing the manner in which chemical solution can be applied to the same.

Referring to the embodiment of the invention illustrated in the drawing, I have shown a pad consisting of an inner assembly 10, together with an outer covering 11. The assembly 10 consists of a sheet 12 of aluminum foil, between the two sheets 13 of absorbent material. The sheets 13 are of non-inflammable mineral fiber, preferably absorbent asbestos paper. The thickness of the aluminum foil may be varied depending upon different requirements or conditions, but in practice I have used a gauge of about .0015 inch, with good results.

Figure 5:
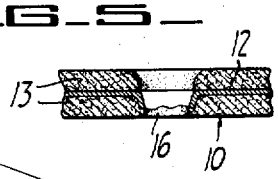
Fig. 5 is a greatly enlarged cross-sectional detail illustrating the manner in which the aluminum and associated sheets of absorbent asbestos, are perforated.

The assembly can be retained together by suitable means, such as two rows of stitching 14, which may extend along the side margins. It is preferably perforated as illustrated, as by passing it through a suitable perforating appliance whereby perforations 16 are formed over the entire area of the assembly. Fig. 5 illustrates the perforations 16 extending through the assembly, so that in effect the openings in the individual sheets of asbestos and aluminum foil are in registry. It is preferable to form these perforations by a piercing appliance so that there is no punching out of material, such as would decrease the effective reactive surface and mass of aluminum foil.

The outer wrapper or protective covering 11 can consist of a sheet of aluminum or tin foil 17, provided with an inner liner 18 of suitable material such as waxed or parchment paper. Such a liner affords a chemically inert membrane to prevent reaction between the chemical solution and the foil covering 17. The inner assembly can be enclosed within the covering 11 in a suitable way, as for example by having the assembly attached by means of elements 21 to the covering.

In making use of the pad described above a suitable chemical solution is provided, to saturate the asbestos sheets 13. Solutions which I can employ contain chemicals such as a salt of a heavy metal, like copper sulphate, capable of exothermic reaction with aluminum, together with an oxidizing reagent like sodium chlorate, to prevent polarization, and a salt like aluminum sulphate, tending to speed up commencement of the steaming period. An example of a chemical solution which can be employed with good results, is as follows:

| | Grams |
|---|---|
| Hydrated copper sulphate | 3 |
| Sodium chlorate | 15 |
| Hydrated aluminum sulphate | ½ |
| Ammonium chloride | ½ |
| Sufficient water to make 30 cc. of solution. | |

The ammonium chloride initially activates the reaction and depresses the pH value of the solution. As the reaction of the solution on the aluminum proceeds, and the solution is heated to an elevated temperature, some decomposition of the ammonium chloride occurs, with the result that the pH value of the solution is raised, to temper the reaction and extend the heating period.

Various expedients can be utilized to saturate the asbestos sheets 13 with the chemical solution. Thus the operator may have a small measuring device such as a measuring dropper 22, by means of which definite amounts of solution can be applied. Assuming that such a dropper or applicator is used, it is filled with a definite amount of solution and the solution is supplied to the assembly 10. The solution immediately penetrates through the perforations to saturate all parts of the assembly.

Figure 3:
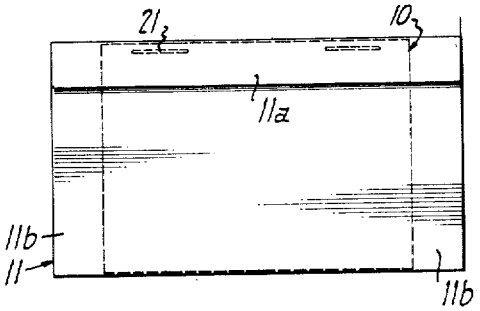
Figs. 3 and 4 are plan views illustrating how the marginal edges of the outer wrapper can be folded over to form a packet, shown in complete form in Fig. 4.
Figure 4:
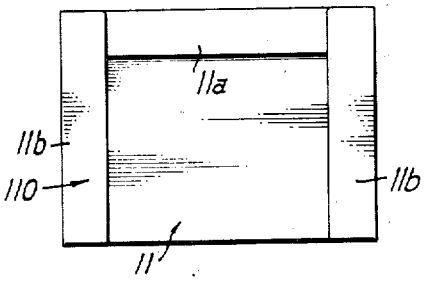
Figure 2:
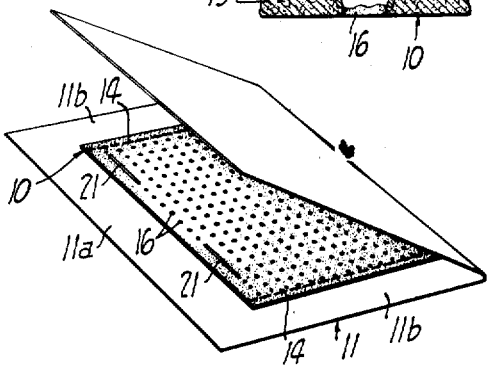
Fig. 2 is a perspective view illustrating the manner in which the pad can be folded after application of chemical solution.
Figure 6:
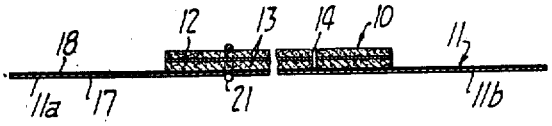
Fig. 6 is an enlarged cross-sectional detail taken along the line 6—6 of Fig. 1, and showing a simple form of attachment to the outer foil covering and the stitching which can be used for retaining the sheets of asbestos material assembled with respect to the aluminum foil.
Figure 7:
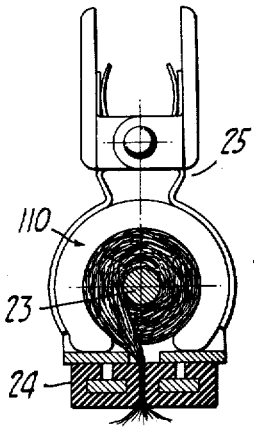
Fig. 7 is an end elevational view partly in cross-section showing the pad as applied to a hair curler and held in place by a suitable clamp.

The pad illustrated is intended for croquignole permanent waving and is of such length that it can be folded as illustrated in Fig. 2, before being applied over a conventional croquignole curler. The entire pad can be folded over as shown in Fig. 2, and the marginal edges of the covering 11 which extend out beyond the edges of the folded assembly 10, can be folded over as a safety precaution against leakage of solution. As indicated in Fig. 3, after folding over as indicated in Fig. 2 marginal edges 11a are folded over followed by a folding over of the marginal edges 11b, as shown in Fig. 4. A complete folded packet as shown in Fig. 4 (designated generally by number 110) can be applied over a strand of wound hair, as for example in the manner illustrated in Fig. 7. In this instance a strand of hair is shown wound about the croquignole curler 23, carried by the croquignole protector 24. The folded packet 110 is retained about the wound strand by suitable means such as the spring clip 25.

It is to be understood that in using the chemical pad described above, the wound hair is moistened with aqueous waving solution, in the same manner as now practiced in conventional permanent hair waving. It is also to be understood that the dimensions of the pad can be varied to suit different requirements, as for example to enable application of the pad to a strand of hair wound about an extended rod spiral fashion, as is well known to those skilled in the art.

Shortly after applying the chemical solution to the inner assembly, the exothermic reaction commences, and by the time the folded packet has been applied about the wound hair, heat is being developed to transfer heat to the wound hair. The temperature of the hair is rapidly elevated to steaming temperature, and the steaming period is extended over a sufficient period of time to lend permanency to the wave. During the heating period the aluminum foil is substantially entirely consumed by the chemical reaction.

Specific reference has been made to the use of asbestos paper to retain the chemical solution. Also it has been pointed out that the solution makes use of an active oxidizing agent like sodium chlorate. At the end of the waving operation at least a part of this oxidizing agent is still present. If the sheets 13 were made of ordinary absorbent paper or like material, impregnation of the cellulose fiber with the oxidizing agent would produce a highly inflammable article, and thus create a fire hazard. Such a fire hazard is entirely avoided by the use of an inert non-inflammable fiber like asbestos, thus making it possible for the operator to discard the pads after they have been used, without particular care as to the manner of their disposal. In addition should one apply chemical solution to a pad and then neglect to apply the pad to a curler, the relatively high temperature attained within the pad can cause no charring of the inner assembly, such as would occur should cellulose fiber like blotting paper be employed. Charring of the inner assembly can be dangerous since it may result in spontaneous combustion or an explosion.

The perforations in the asbestos sheets 13 facilitate saturation of the sheets with the chemical solution. Perforating the aluminum sheets 13 augments the edge area of the aluminum foil which is exposed to the chemical solution. Carrying out the perforating operation as described tends to cause sheets 13 to adhere to opposite sides of the aluminum foil so that the side surfaces of the aluminum foil are retained in physical contact with the asbestos sheets.

The aluminum foil employed is preferably one having its surfaces covered by a thin oil film. This oil film may be of ordinary petroleum lubricating oil, applied at the time the foil is manufactured, and serves to protect the surfaces of the foil against further oxidation. It is desirable that this oil film remain substantially intact because when the strength of the solution is made to enable an optimum type of reaction with the aluminum foil, with commencement of the steaming period within a given period of time, such factors should not be subject to gradual changes. In this connection it should be explained that the nature of the oil film affects the time period for commencing active reaction of the solution with the aluminum, and in addition it protects the foil against oxidation. Materials made of cellulose fiber, as for example blotting paper, tend to gradually absorb such an oil film, with the result that the action obtained for a given strength of solution is subject to changes. However, asbestos paper because of its inherent characteristics, has been found not to absorb or modify the oil film to any material degree. Thus the characteristics of the pad remain substantially constant over a long period of time, and over this period of time the pad will react in the same manner with the same strength of solution.

I claim:

1. In a chemical heating pad for permanent hair waving, a sheet of metallic foil, and a sheet of asbestos paper disposed in intimate contact with one side of the aluminum foil, the sheet of asbestos fiber being adapted to be saturated with a chemical solution for exothermic reaction with the aluminum foil.

2. In a chemical heating pad for permanent hair waving, a sheet of aluminum foil, a sheet of absorbent asbestos paper in contact with one side of the aluminum foil, said sheet of asbestos paper being capable of retaining a chemical solution for exothermic reaction with the aluminum foil, both said sheets being enclosed within a protective wrapper.

3. In a chemical heating pad for permanent hair waving, a sheet of aluminum foil, and a flexible sheet of absorbent asbestos paper in intimate contact with one side of the aluminum foil, both the aluminum foil and the asbestos paper being perforated, the sheet of asbestos paper being capable of retaining a chemical solution for exothermic reaction with the aluminum foil.

4. In a chemical heating pad for permanent hair waving, a sheet of aluminum foil, and a plurality of sheets of absorbent asbestos paper disposed in intimate contact with the side surfaces of the aluminum foil, perforations extending through both the sheets of asbestos paper and the aluminum foil, said sheets forming an inner assembly adapted to be moistened with a chemical solution for exothermic reaction with the metallic foil, and a protective wrapper serving to enclose the assembly.

5. In a chemical heating pad for permanent hair waving, a sheet of aluminum foil, and a sheet of asbestos paper in intimate contact with the one side of the foil, the foil having a thin film of oil covering the same.

FREDERICK L. REYNOLDS.

DISCLAIMER

Re. 21,276.—*Frederick L. Reynolds*, Mill Valley, Calif. CHEMICAL HEATING PAD FOR PERMANENT HAIR WAVING. Patent dated November 21, 1939. Disclaimer filed October 27, 1941, by the assignee, *United States Appliance Corporation*.

Hereby enters this disclaimer to claims 1 and 2 in said specification.

[*Official Gazette November 18, 1941.*]